United States Patent
Yan

(10) Patent No.: US 11,277,457 B2
(45) Date of Patent: Mar. 15, 2022

(54) IMAGE PROCESSING METHOD, SERVER, CLIENT AND IMAGE PROCESSING SYSTEM

(71) Applicant: BOE Technology Group Co., Ltd., Beijing (CN)

(72) Inventor: Xinquan Yan, Beijing (CN)

(73) Assignee: BOE Technology Group Co., LTD, Beijing (CN)

(*) Notice: Subject to any disclaimer, the term of this patent is extended or adjusted under 35 U.S.C. 154(b) by 0 days.

(21) Appl. No.: 16/897,335

(22) Filed: Jun. 10, 2020

(65) Prior Publication Data
US 2021/0160298 A1    May 27, 2021

(30) Foreign Application Priority Data
Nov. 25, 2019    (CN) .......................... 201911168501.X

(51) Int. Cl.
| G06F 15/16 | (2006.01) |
| G06F 9/54 | (2006.01) |
| H04L 29/06 | (2006.01) |
| H04L 65/60 | (2022.01) |
| G06F 9/50 | (2006.01) |
| H04L 67/10 | (2022.01) |

(52) U.S. Cl.
CPC ............ H04L 65/60 (2013.01); G06F 9/5005 (2013.01); H04L 67/10 (2013.01)

(58) Field of Classification Search
CPC ........ H04L 65/60; H04L 67/10; G06F 9/5005
USPC ........................................................ 709/201
See application file for complete search history.

(56) References Cited

U.S. PATENT DOCUMENTS

| 5,179,637 A * | 1/1993 | Nardozzi | G06F 3/1211 345/505 |
| 5,859,711 A * | 1/1999 | Barry | G03G 15/5087 358/296 |
| 7,783,695 B1 * | 8/2010 | Tyrrell, III | G06F 9/5055 709/201 |
| 8,130,400 B2 * | 3/2012 | Caruso | G06F 3/1286 358/1.15 |
| 10,037,406 B2 * | 7/2018 | Westin | G16H 40/67 |
| 2003/0086595 A1 * | 5/2003 | Hu | G06T 9/00 382/128 |
| 2003/0223650 A1 * | 12/2003 | Kim | G06T 3/40 382/302 |

(Continued)

OTHER PUBLICATIONS

Image Web Server User Guide, Mar. 5, 2001 Revision 1.52, http://www.cartografia.cl/download/manuales/ermapper6_imageweb.pdf (Year: 2001).*

*Primary Examiner* — Hamza N Algibhah
(74) *Attorney, Agent, or Firm* — Fay Sharpe LLP

(57) ABSTRACT

The present disclosure relates to an image processing method, a server, a client and an image processing system. The image processing method is applicable to the server and includes: receiving an image processing request from the client, wherein the image processing request includes a to-be-processed image in a first image format; acquiring the to-be-processed image according to the image processing request, and processing the to-be-processed image to obtain a target image in a second image format; and generating a feedback message according to the target image, and sending the feedback message to the client.

11 Claims, 5 Drawing Sheets

(56) References Cited

U.S. PATENT DOCUMENTS

| | | | | |
|---|---|---|---|---|
| 2009/0051962 A1* | 2/2009 | Asai | ............... | H04N 1/00225 |
| | | | | 358/1.15 |
| 2013/0138717 A1* | 5/2013 | Lingley | ............... | H04L 47/25 |
| | | | | 709/203 |
| 2014/0188930 A1* | 7/2014 | Raichelgauz | ........... | G06F 16/43 |
| | | | | 707/769 |
| 2016/0328110 A1* | 11/2016 | Zhao | ................ | G06F 16/51 |
| 2017/0094101 A1* | 3/2017 | Saito | ............... | H04N 1/00106 |
| 2017/0126926 A1* | 5/2017 | Saito | ............... | H04N 1/32358 |
| 2018/0018337 A1* | 1/2018 | Raichelgauz | ........ | H04H 20/103 |
| 2018/0150467 A1* | 5/2018 | Raichelgauz | .......... | H04H 60/56 |
| 2019/0205331 A1* | 7/2019 | Cevahir | ............... | G06F 16/538 |
| 2019/0287154 A1* | 9/2019 | Kakinuma | ............ | G06F 16/583 |
| 2019/0361650 A1* | 11/2019 | Ren | ..................... | G06F 3/1239 |
| 2020/0226152 A1* | 7/2020 | Raichelgauz | ........ | G06F 16/7847 |
| 2020/0401851 A1* | 12/2020 | Mau | ..................... | G06K 9/4628 |

\* cited by examiner

IMAGE PROCESSING METHOD, SERVER, CLIENT AND IMAGE PROCESSING SYSTEM The present disclosure claims priority to Chinese Patent Application No. 201911168501.X, filed on Nov. 25, 2019 and entitled "IMAGE PROCESSING METHOD, SERVER, CLIENT AND IMAGE PROCESSING SYSTEM", the entire contents of which are incorporated herein by reference.

TECHNICAL FIELD

The present disclosure relates to the field of image processing technology, and particularly to an image processing method, a server, a client, and an image processing system.

BACKGROUND

With the development of terminal display technology, display solutions of terminals have been flourishing. Owing to its features of ultra-thinness, light weight, low price, comfortableness and ultra-low power consumption, an electronic terminal including a display panel using the electrophoresis display (EPD) technology has become a very important device which exhibits and collects terminal information in current IOT (Internet of Things) solutions. However, due to the special material and technology, a displayed image needs to comply with a proprietary display protocol. Moreover, due to a complex image processing module being unable to build in the device, the image needs to be processed efficiently and stably in back end. The requirements on complexity, professionalism and security of an image processing algorithm cause a lot of difficulties and inconvenience to the back-end service convergence, which in turn leads to high labor costs and low operating efficiency.

SUMMARY

The present disclosure provides an image processing method, a server, a client and an image processing system to avoid defects in the related art.

According to a first aspect of embodiments of the present disclosure, an image processing method is provided. The method is applicable to a server, and includes:

receiving an image processing request from a client, the image processing request including a to-be-processed image in a first image format;

acquiring the to-be-processed image according to the image processing request, and processing the to-be-processed image to obtain a target image in a second image format; and generating a feedback message according to the target image, and sending the feedback message to the client.

In some embodiments, the server includes at least one image engine; and acquiring the to-be-processed image according to the image processing request, and processing the to-be-processed image to obtain the target image in the second image format include:

determining a first target image engine for processing the image processing request in the at least one image engine; and invoking the first target image engine, acquiring the to-be-processed image according to the image processing request by the first target image engine, and processing the to-be-processed image to obtain the target image in the second image format.

In some embodiments, determining the first target image engine for processing the image processing request in the at least one image engine includes:

acquiring a state identifier of each of the at least one image engine, the state identifier being intended to identify whether the image engine is in an operating state or an idle state; and determining the first target image engine in the idle state according to the state identifier of each of the at least one image engine.

In some embodiments, determining the first target image engine for processing the image processing request in the at least one image engine includes:

acquiring a processing capability identifier of each of the at least one image engine; and determining the first target image engine according to the processing capability identifier of each of the at least one image engine and a first allocation policy, the first allocation policy being relevant to the processing capability identifier of the image engine.

In some embodiments, determining the first target image engine for processing the image processing request in the at least one image engine includes:

acquiring a processing capability identifier of each of the at least one image engine and a quantity of image processing requests to be currently processed; and determining the first target image engine according to the processing capability identifier of each of the at least one image engine, the quantity of image processing requests to be currently processed and a second allocation policy, wherein the second allocation policy is relevant to a processing capability identifier of the image engine and the quantity of image processing requests to be currently processed.

In some embodiments, the image processing method further includes:

processing the to-be-processed image to obtain a preview image of the target image, the preview image complying with a display protocol of the client;

wherein generating the feedback message according to the target image includes:

generating the feedback message according to the target image and the preview image.

In some embodiments, the image processing request includes service information; and the method further includes:

acquiring the service information according to the image processing request; and generating the feedback message according to the target image includes:

generating the feedback message according to the target image and the service information.

In some embodiments, the second image format is a binary image format that complies with a display protocol of an electrophoresis display screen.

According to a second aspect of embodiments of the present disclosure, an image processing method is provided. The method is applicable to a client, and includes:

generating an image processing request according to a to-be-processed image in a first image format;

sending the image processing request to a server, such that the server acquires the to-be-processed image according to the image processing request, processes the to-be-processed image to obtain a target image in a second image format, and generates a feedback message according to the target image; and receiving the feedback message from the server.

In some embodiments, the feedback message includes a preview image that complies with a display protocol of the client; and the method further includes:

acquiring the preview image according to the feedback message; and displaying the preview image.

According to a third aspect of embodiments of the present disclosure, a computer device is provided. The device includes a processor and a memory, wherein the memory is configured to store a computer program, and the processor is configured to execute the computer program stored in the memory to perform the method as defined in the first aspect or the second aspect.

According to a fourth aspect of embodiments of the present disclosure, a computer-readable storage medium is provided, wherein a computer program is stored in the computer-readable storage medium. The computer program is executable by a processor to perform the method as defined in the aforesaid first aspect or the aforesaid second aspect.

According to a fifth aspect of embodiments of the present disclosure, an image processing system is provided. The system includes a server and a client; wherein the server includes a processor and a memory, wherein the memory is configured to store a computer program, and the processor is configured to execute the computer program stored in the memory to perform the method as defined in the first aspect;

the client includes a processor and a memory, wherein the memory is configured to store a computer program, and the processor is configured to execute the computer program stored in the memory to perform the method as defined in the aforesaid second aspect;

In some embodiments, the image processing request includes service information, the feedback message includes the target image and the service information, the image processing system further includes a database; and the client is configured to acquire the target image and the service information according to the feedback message, and store the target image and the service information in the database.

In some embodiments, the image processing system further includes a message forwarding device, a border gateway, and a display device, wherein the client is configured to generate a service instruction according to the target image and the service information, and send the service instruction to the message forwarding device;

the message forwarding device is configured to acquire the service information according to the service instruction, determine the corresponding border gateway according to the service information and a corresponding relationship between the service information and the border gateway, and send the target image to the corresponding border gateway; and the border gateway is configured to send the target image to the display device, such that the display device displays the target image.

It is to be understood that both the above general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
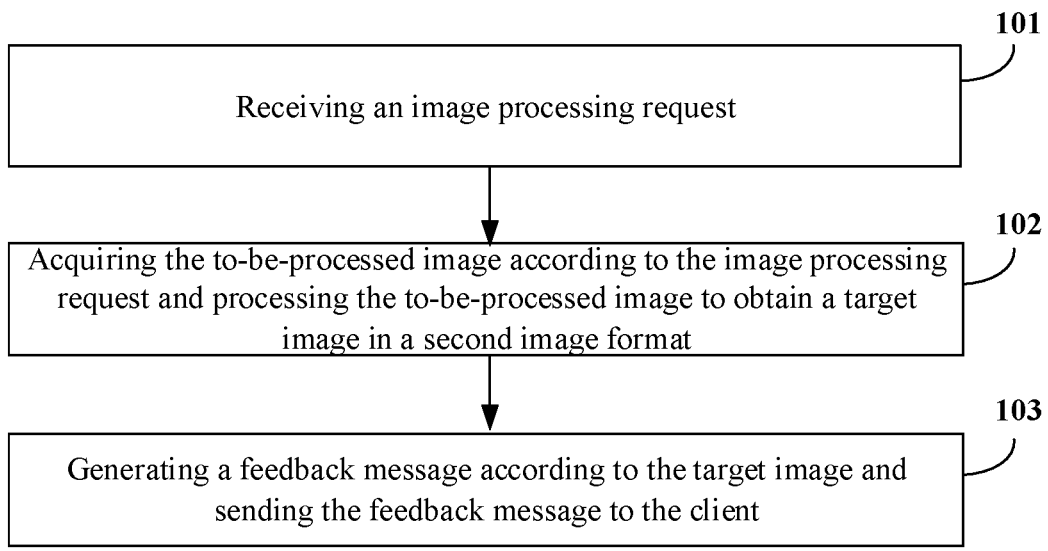
FIG. 1 is a schematic flowchart of an image processing method in accordance with an embodiment of the present disclosure.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the invention/disclosure as recited in the appended claims.

An embodiment of the present disclosure provides an image processing method applied to a server. As shown in FIG. 1, the image processing method includes the following steps 101 to 103.

In step 101, the server receives an image processing request from a client. The image processing request includes a to-be-processed image in a first image format.

In step 102, the server acquires the to-be-processed image according to the image processing request and processes the to-be-processed image to obtain a target image in a second image format.

In step 103, the server generates a feedback message according to the target image and sends the feedback message to the client.

In the present embodiment, the server receives the image processing request, sent by the client and including the to-be-processed image in the first image format, acquires the to-be-processed image according to the image processing request, then, processes the to-be-processed image to obtain the target image in the second image format, after that, generates the feedback message according to the target image, and sends the feedback message to the client, such that the client acquires the target image in the second image format. In this way, an image processing task originally undertaken by the client may be transferred to the server. The client focuses on service processing, and the server focuses on image processing, thereby realizing decoupling of the service processing and the image processing. At the same time, the client may not obtain processing details of an image processing process performed by the server, so as to shield the service processing from the complexity and implementation details of the image processing. Therefore, the complexity of the image processing and the labor cost are reduced, and the operating efficiency is improved.

Figure 2:
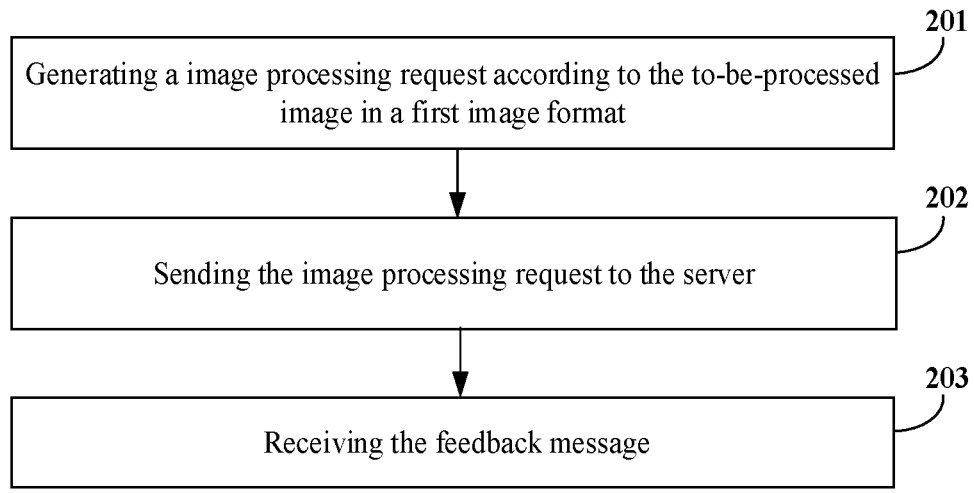
FIG. 2 is a schematic flowchart of another image processing method in accordance with an embodiment of the present disclosure.

An embodiment of the present disclosure further provides an image processing method applied to a client. As shown in FIG. 2, the image processing method includes the step 201 to step 203.

In step 201, the client generates a image processing request according to the to-be-processed image in a first image format.

In step 202, the client sends the image processing request to a server, such that the server acquires the to-be-processed image according to the image processing request, processes the image to the processed to obtain a target image in a second image format, and generates a feedback message according to the target image.

In step 203, the client receives the feedback message from the server.

In the present embodiment, the client generates the image processing request according to the to-be-processed image in the first image format, and sends the image processing request to the server, such that the server acquires the to-be-processed image according to the image processing request, processes the image to the processed to obtain the target image in the second image format and generates the feedback message according to the target image. The client receives the feedback message from the server. In this way, an image processing task originally undertaken by the client may be transferred to the server. The client focuses on service processing, and the server focuses on image processing, thereby realizing decoupling of the service processing and the image processing. At the same time, the client may not obtain processing details of an image processing process performed by the server, so as to shield the service processing from the complexity and implementation details of the image processing. Therefore, the complexity of the image processing and the labor cost are reduced, and the operating efficiency is improved.

Figure 3:
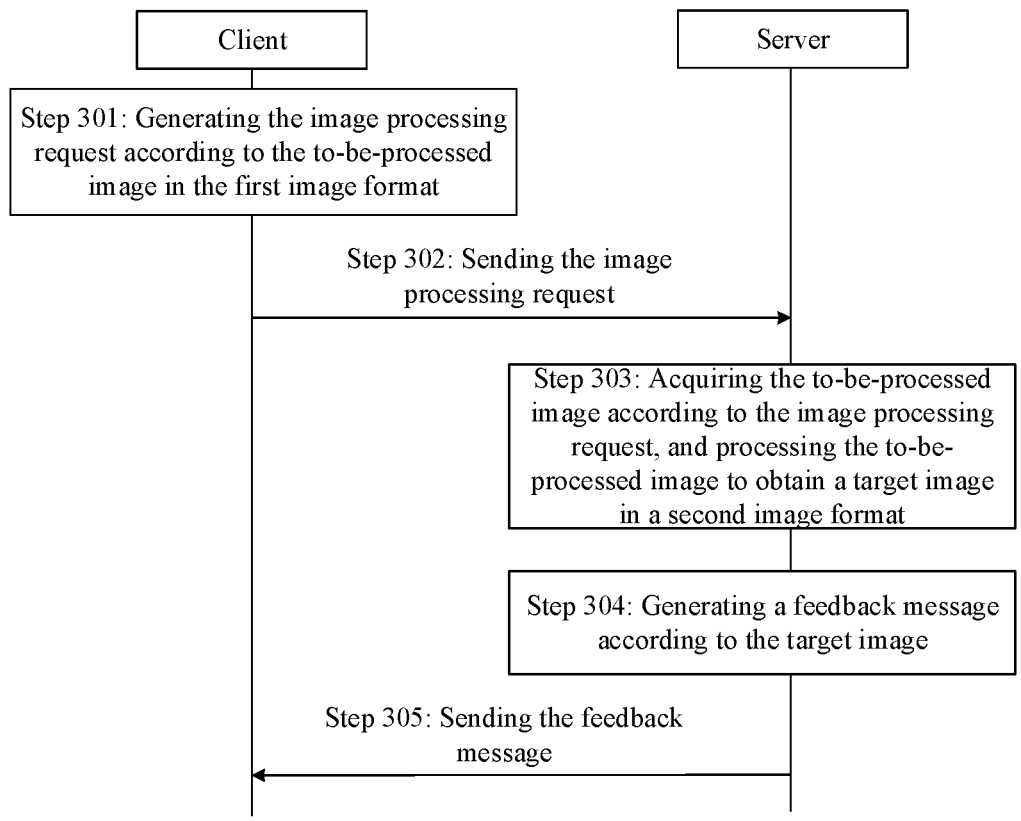
FIG. 3 is a schematic flowchart of yet another image processing method in accordance with an embodiment of the present disclosure.

An embodiment of the present disclosure further provides an image processing method applied to an image processing system. The image processing system includes a server and a client. As shown in FIG. 3, the image processing method includes the step 301 to 305.

In step 301, the client generates an image processing request according to the to-be-processed image in a first image format.

In some embodiments, the image processing system may be configured to provide image processing services for electronic handles on public transportation. The public transportation may be a bus, a subway, a train or a ferry. The handles are facilities that assists passengers who take the public transportation means to maintain body balance. A traditional handle generally has an area for placing paper advertisements. This area usually allows regularly changing the paper advertisements. An electronic handle may include a handle body and a display screen. The display screen may be disposed in the area of the traditional handle where the paper advertisements are placed, and may be a display screen using the EPD technology. When it is necessary to change a display content of the display screen, the image processing method provided by the present disclosure may be used for changing the display content without manual replacement by the worker. As such, the display content may be changed more efficiently.

In some embodiments, the client may receive the to-be-processed image in the first image format, uploaded by a user, and display the to-be-processed image, such that the user can confirm a content of the to-be-processed image. The first image format may be JPG, JPEG, PNG, GIF, BMP, TIF, PCX, TGA, EXIF, FPX, SVG, PSD, CDR, PCD, DXF, UFO, EPS, AI, RAW, WMF, or Webp.

It should be noted that, because the to-be-processed image in the first image format may not conform to a display protocol of the display screen of the electronic handle, when the display screen of the electronic handle is required to display the content of the to-be-processed image, the to-be-processed image needs to be processed to obtain a target image that conforms to the display protocol of the display screen of the electronic handle.

In some embodiments, an image process instruction may be input after the user confirms the content of the to-be-processed image. In response to the image process instruction, the client may generate an image processing request according to the to-be-processed image in the first image format. The image processing request includes the to-be-processed image in the first image format.

In some embodiments, the image processing request may be in a JSON JavaScript Object Notation (JSON) format or an Extensible Markup Language (XML) format. If the image processing request is in the JSON format, the capacity of the image processing request is smaller, a bandwidth occupied during transmission is lower, and a transmission speed is higher; and if the image processing request is in the XML format, the image processing request may adapt to more systems, and transmission of the image processing request is more convenient. A technician may set the format of the image processing request according to actual needs, which is not limited in the embodiments of the present disclosure.

In step 302, the client sends the image processing request to the server.

In some embodiments, the client may be communicably connected to the server. The client may send the image processing request to the server.

In step 303, the server acquires the to-be-processed image according to the image processing request and processes the to-be-processed image to obtain a target image in a second image format.

In some embodiments, the server may include at least one image engine, invoke any one of the image engines, and allocate one image processing request thereto. The invoked image engine may parse the image processing request to obtain the to-be-processed image. Then, the server may process the to-be-processed image by the invoked image engine to obtain the target image in the second image format. Therefore, the embodiments of the present disclosure realize a stateless processing service by the image engine. That is, the image engine does not need to store any information relevant to the to-be-processed image when processing the to-be-processed image, and each time a different to-be-processed image is input, the image may be processed in the same way, thereby solving the problem of complex interaction between basic service functions and the image processing engines, and facilitating horizontal expansion of the image processing capability. Therefore, flexible scaling can be performed as required, high availability is supported, and the growth demand of services is met.

In some embodiments, the image engine may be an independent processing engine which deeply encapsulates a complex image processing algorithm based on the Flask framework technology. The image engine may provide an open service Restful API for external clients to access internal core image engine functions in a unified manner. In the embodiments of the present disclosure, all common functions such as input analysis, conversion and serialization of data protocol specifications in the original image processing algorithm functions are entrusted to the image engine by the Flask framework technology. That is, the client does not need to undertake the image processing task, instead, the image processing task is transferred to the server. The user may directly obtain the target image corresponding to the to-be-processed image only by inputting the to-be-processed image on the client. At the same time, internal implementation details are shielded for external access. That is, the client may only input the to-be-processed image to the server and obtain the target image by the server, and may not obtain the process of processing the to-be-processed image into the target image by the server. External access and internal invoking are logically isolated, such that service modules focus on service processing, and all the modules are mutually independent. The corresponding modules can be directly changed during function expansion of the system to achieve a low-coupling and high-scaling design. Moreover, the mutually independent image engines can support hot replacement and second-level upgrading of core modules of the image algorithm and are transparent and seamless for service functions.

It should be noted that Flask is a lightweight web application framework written in Python, and it is also called "micro framework", which is simple in core, friendly in micro service solution and easy to expand. By relying on Python's powerful and complete ecosystem, Flask may be applied to image processing and data processing. Moreover, the image engine based on the Flask framework technology in the embodiments of the present disclosure may be applied to a LINUX system, a Windows system and a Mac system, realizing cross-platform and enhancing the applicability.

In some embodiments, the second image format may be a binary image format that conforms to a display protocol of an EPD screen. The display protocol of the EPD screen may be relevant to the quantity and arrangement of pixels in the EPD screen. For example, if the EPD screen contains 3*2=6 pixels, 3 indicates that there are 3 pixels in each row of the EPD screen, and 2 indicates that there are two rows of pixels in the EPD screen. Correspondingly, the binary image format conforming to the display protocol of the EPD screen may be a matrix of 3*2, which may include two types of numbers, 0 and 1, wherein 0 may indicate that the color of the corresponding pixel is white, and 1 may indicate that the color of the corresponding pixel is black. Further, according to the display principle of the EPD screen, each pixel of the EPD screen may be composed of an upper electrode, transparent microcapsules, and a lower electrode. The upper electrode is proximal to the user, the lower electrode is distal from the user, and the transparent microcapsules are disposed between the upper electrode and the lower electrode. An electrolyte solvent, positively charged white powder, and negatively charged black powder exist in the transparent microcapsules. When it is determined that the color of any pixel is black, that is, the corresponding value of the pixel in the above matrix is 1, the EPD screen may control the upper electrode of the pixel to be positively charged, and the lower electrode to be negatively charged. In this way, the negatively charged black powder is electrophoresed toward the upper electrode in the electrolyte solution, and the positively charged white powder is electrophoresed toward the lower electrode in the electrolyte solution. Thus, from the user's perspective, the color of the pixel is black.

Figure 4:
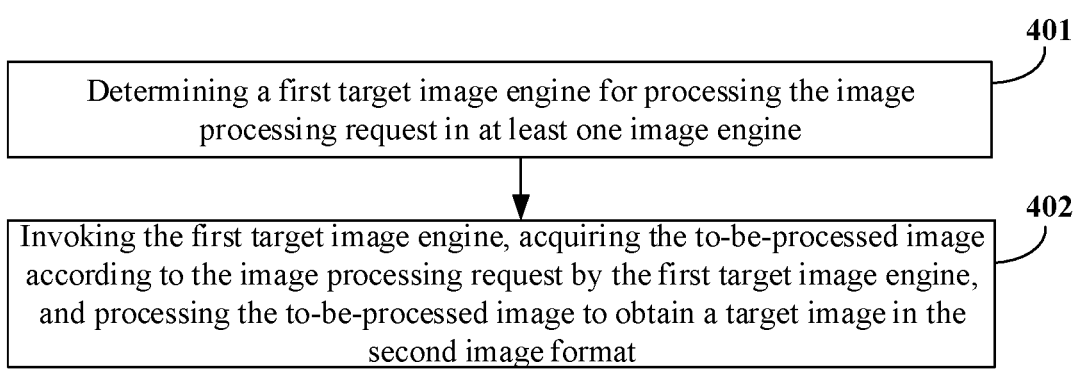
FIG. 4 is a schematic flowchart of yet another image processing method in accordance with an embodiment of the present disclosure.

In some embodiments, as shown in FIG. 4, step 303 may include steps 401 to 402.

In step 401, the server determines a first target image engine for processing the image processing request in at least one image engine.

In step 402, the server invokes the first target image engine, acquires the to-be-processed image according to the image processing request by the first target image engine, and processes the to-be-processed image to obtain a target image in a second image format.

In some embodiments, after receiving the image processing request, the server may determine the first target image engine for processing the image processing request from all the image engines. The server may invoke the first target image engine, allocate the image processing request to the first target image engine, acquire the to-be-processed image according to the image processing request by the first target image engine, and process the to-be-processed image to obtain the target image in the second image format. The process in which the server processes the to-be-processed image by the first target image engine, will be explained below: the red, green and blue (RGB) values of each pixel in the to-be-processed image may be determined after the first target image engine acquires the to-be-processed image. The grey value of each pixel is determined according to the RGB values of each pixel, and processed according to a target grey threshold to obtain a color corresponding to each pixel. The target image in the second image format is acquired according to the color corresponding to each pixel. For example, if the format of the to-be-processed image is JPEG, the first target image engine may convert the format of the to-be-processed image into a Bitmap (BMP) format, and the image in the BMP format includes the RGB values of each pixel. Taking one pixel as an example, its RGB values may be (183, 79, 20). The first target image engine may convert the RGB values to a grey value of 103 using formula (1). The first target image engine may determine the color of the pixel as black if the target grey threshold is 100, and the color of one pixel as white if the grey value of the pixel is 92. The first target image engine may use 1 to indicate that the color of the pixel is black, and 0 to indicate that the color of the pixel is white, thereby generating a matrix containing 0 and 1, which corresponds to the target image in the second image format.

$$\text{Grey}=0.299*R+0.587*G+0.114*B \qquad (1), \text{in which}$$

Grey is the grey value, R is the color value of red, G is the color value of green, and B is the color value of blue.

Figure 5:
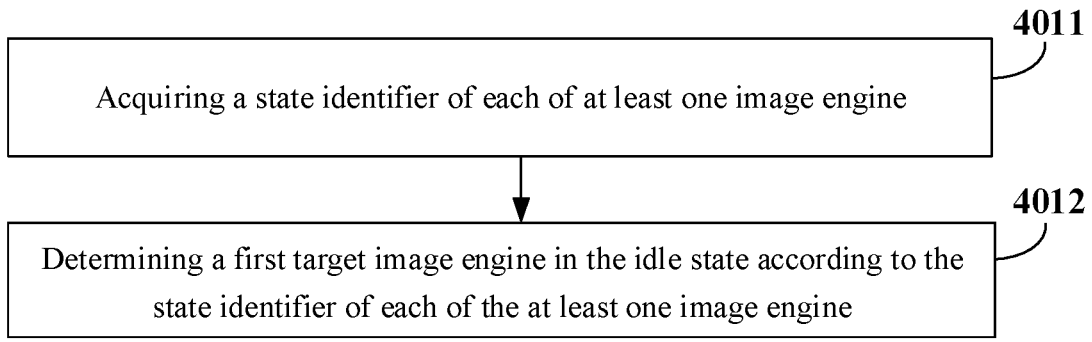
FIG. 5 is a schematic flowchart of yet another image processing method in accordance with an embodiment of the present disclosure.

In some embodiments, as shown in FIG. 5, step 401 may include steps 4011 to 4012.

In step 4011, the server acquires a state identifier of each of at least one image engine.

The state identifier is intended to identify whether the image engine is in an operating state or an idle state.

In step 4012, the server determines a first target image engine in the idle state according to the state identifier of each of the at least one image engine.

In some embodiments, the server may further include a control module that may periodically acquire the state identifier of each of all the image engines. For example, if the state identifier is 1, the image engine is in an operating state; and if the state identifier is 0, the image engine is in an idle state. After the server receives the image processing request, the control module may determine the image engine in the idle state according to the state identifier of each of all the image engines, and takes the image engine in the idle state as the first target image engine. When a plurality of image engines in the idle state are arranged, one of the image engines in the idle state may be randomly selected as the first target image engine, which is not limited thereto.

In step 304, the server generates a feedback message according to the target image.

In some embodiments, the server may generate a feedback message according to the target image. The feedback message may include the target image and may be in a JSON format or an XML format.

In some embodiments, the server may serialize the target image to obtain serialized data. Serialization is to convert the target image into data in the JSON format or the XML format. Correspondingly, the serialized data is also data in the JSON format or the XML format. Then, the server may encode the serialized data into the feedback message. In some embodiments, encoding the serialized data into the feedback message may use a Base64 encoding mode, which is not limited thereto.

In some embodiments, the feedback message may include an image verification code to avoid tampering with the target image.

In step 305, the server sends the feedback message to the client.

In some embodiments, the server may send the feedback message to the corresponding client according to the image processing request, and the client may decode the feedback message to obtain serialized data and obtain the target image according to the serialized data. The image processing request may include an identity of the client.

In the embodiments of the present disclosure, the client sends the image processing request including the to-be-processed image in the first image format to the server, such that the server processes the to-be-processed image to obtain the target image in the second image format, generates the feedback message according to the target image, and sends the feedback message to the client. Thus, the client acquires the target image in the second image format. In this way, service processing and image processing may be decoupled, and the service processing is shielded from the complexity and implementation details of the image processing. Therefore, the complexity of the image processing and the labor cost are reduced, and the operating efficiency is improved.

In some embodiments, the server may also process the to-be-processed image to obtain a preview image of the target image, and then generate a feedback message according to the target image and the preview image. The preview image conforms to a display protocol of the client. The client may acquire the preview image according to the feedback message and display the preview image. In this way, the client may display the preview image for the user to confirm whether the target image meets the requirements or not.

In some embodiments, the format of the preview image may be JPG, JPEG, PNG, GIF, BMP, TIF, PCX, TGA, EXIF, FPX, SVG, PSD, CDR, PCD, DXF, UFO, EPS, AI, RAW, WMF or Webp.

In some embodiments, the image processing request may further include service information for searching for a target image in a certain business field, and the business field may represent a usage scenario of the target image. For example, the service information may be identification information of public transportation, but is not limited thereto. For example, the service information may be identification information "Line 10" of a Metro Line 10, which means that the target image acquired according to the to-be-processed image in the image processing request is an image used for the Metro Line 10. The server may acquire the to-be-processed image and service information "Line 10" according to the image processing request, and after processing the to-be-processed image into the target image, generate a feedback message according to the target image and the service information "Line 10". The client may receive the feedback message from the server, and acquire the target image and the service information "Line 10" according to the feedback message. Further, the client may determine the target image as the image used for the Metro Line 10 according to the service information "Line 10", and send the target image to devices on the Metro Line 10.

Further, the image processing system may further include a database. The client may bind and store the target image and the service information in the database. In subsequent use, the client may query the corresponding target image in the database according to the service information, directly invoke the target image and apply the target image to the usage scenario corresponding to the service information. For example, the user who wants to replace the image of the Metro Line 10 with a certain target image may input the service information "Line 10" corresponding to the Metro Line 10 on the client, and the client may query in the database according to the service information "Line 10" to acquire at least one target image corresponding to the service information "Line 10". The user may select from the at least one target image by the client to determine the target image to be changed. The client may send the target image selected by the user to the electronic handles of the Metro Line 10 so as to update the image displayed in the electronic handles.

In some embodiments, the image processing system may further include a message forwarding device. The client may receive an image update instruction input by the user and including service information, query in the database according to the service information in the image update instruction, acquire the corresponding target image, generate a service instruction according to the target image and the service information, and send the service instruction to the message forwarding device.

In some embodiments, the image processing system may further include a border gateway. A corresponding relationship between the service information and the border gateway may be pre-stored in the message forwarding device. The service information and an address of the border gateway may be correlatively stored in the corresponding relationship between the service information and the border gateway, which is not limited thereto. The message forwarding device may determine the address of the corresponding border gateway according to the service information, send the service information to the border gateway according to the address of the border gateway, and send the target image to the corresponding border gateway.

In some embodiments, the image processing system may further include a display device, which may be the display screen of the electronic handle described above. The border gateway may send the target image to the display device by means of message multicasting, such that the display device displays the target image.

Nevertheless, in other embodiments, the feedback message may further include a target image, a preview image and service information. In the embodiments of the present disclosure, the client may also store the target image, the preview image and the service information in the database. When the display content of the electronic handle of the public transportation needs to be updated, the user may input an image update instruction to the client, and the client may query in the database according to the service information in the image update instruction and acquire the corresponding target image and preview image. The client may display the preview image for the user to confirm. In response to the user's confirmation operation, a service instruction is generated according to the target image and the service information, and issued to an IOT infrastructure (such as the message forwarding device). The service instruction includes the service information and the target image. The above-mentioned IOT infrastructure may forward the service instruction to a remote border gateway. The border gateway multicasts a message that includes the target image. After receiving the message, the electronic handle displays the target image on the display screen to complete updating of the display content.

In the embodiments of the present disclosure, the server may include a plurality of servers. For example, the server may include a business server and an image processing server. The business server is configured to process business-related instructions, such as establishing a connection with the client, receiving the image processing request from the client, sending the to-be-processed image in the image processing request to the image processing server and sending the feedback message to the client. The image processing server is configured to process the to-be-processed image to obtain the target image. That is to say, the business server and the image processing server are two servers that physically exist. The business server cannot learn a specific process in which the image processing server processes the to-be-processed image. From the perspective of the client, the client can directly acquire the feedback message including the target image only by obtaining the to-be-processed image as an input, such that the core of the image algorithm can be physically isolated. Moreover, it is also possible to carry out individual permission control and set permissions for the user to access the image engine, so as to protect the algorithm from an illegal request from the outside. In this way, the core capability of the system can be protected.

Figure 6:
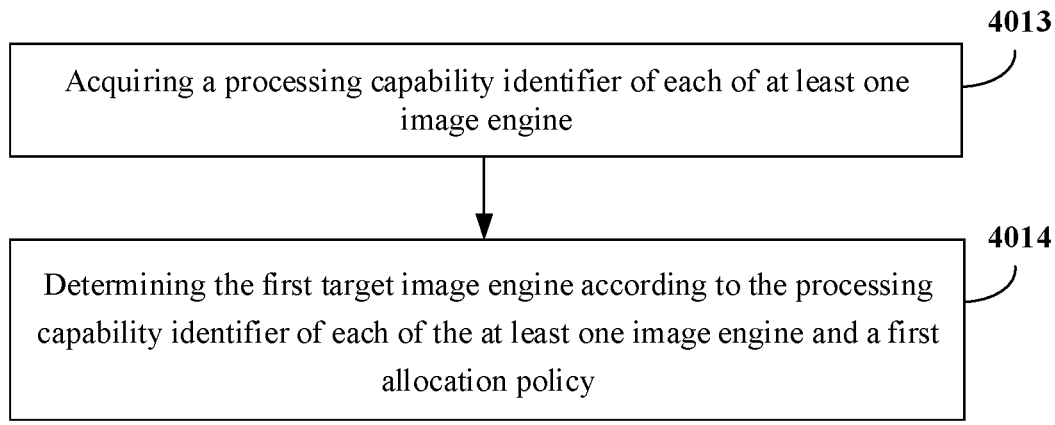
FIG. 6 is a schematic flowchart of yet another image processing method in accordance with an embodiment of the present disclosure.

An embodiment of the present disclosure further provides an image processing method. In the present embodiment, as shown in FIG. 6, step 401 may include steps 4013 to 4014.

In step 4013, the server acquires a processing capability identifier of each of at least one image engine.

In step 4014, the server determines the first target image engine according to the processing capability identifier of each of the at least one image engine and a first allocation policy. The first allocation policy is relevant to the processing capability identifier of the image engine.

In this embodiment, the server may further include a storage module, which stores the respective processing capability identifiers of all the image engines and the first allocation policy. The processing capability identifiers are configured to identify processing capabilities of the image engines. The first allocation policy may be a default setting or a user setting and is relevant to the processing capability identifier of the image engine. For example, the first allocation policy may include a corresponding relationship between the processing capability identifier and the allocation number of the image processing requests. For example, if the processing capability identifier is 1, it indicates that the image engine may process up to 10 image processing requests per second, 10 is the maximum processing capability of the image engine, and the allocation number of the image processing requests may be any number from 1 to 10. If the processing capability identifier is 2, it indicates that the image engine may process up to 5 image processing requests, 5 is the maximum processing capability of the image engine, and the allocation number of the image processing requests may be any number from 1 to 5.

After the server receives the image processing request, the control module may query in the storage module and determine the first target image engine according to the respective processing capability identifiers of all the image engines and the first distribution policy. For example, after receiving 12 image processing requests, the server may query in the storage module and allocate 10 image processing requests to the image engine with the processing capability identifier of 1 and the remaining 2 image processing requests to the image engine with the processing capability identifier of 2. That is, the image engine with the processing capability identifier of 1 is the first target image engine for processing the above 10 image processing requests, and the image engine with the processing capability identifier of 2 is the first target image engine for processing the remaining 2 image processing requests. Alternatively, after receiving 12 image processing requests, the server may query in the storage module, and determine a difference of processing capability between the image engine with the processing capability identifier 1 and the image engine with the processing capability identifier 2. If the image engine with the processing capability identifier 1 is the first target image engine for processing the above 10 image processing requests, and the image engine with the processing capability identifier 2 is the first target image engine for processing the remaining 2 image processing requests, the server may determine that the processing capability of the image engine with the processing capability identifier 1 is twice of that of the image engine with the processing capability identifier 2. Then, 8 image processing requests may be allocated to the image engine with the processing capability identifier of 1, and 4 image processing requests may be allocated to the image engine with the processing capability identifier of 2.

In this embodiment, the server determines the first target image engine according to the respective processing capability identifiers of the image engines and the first distribution policy, and may allocate the image processing requests according to the processing capacities of the image engines, such that the image processing efficiency can be improved.

Figure 7:
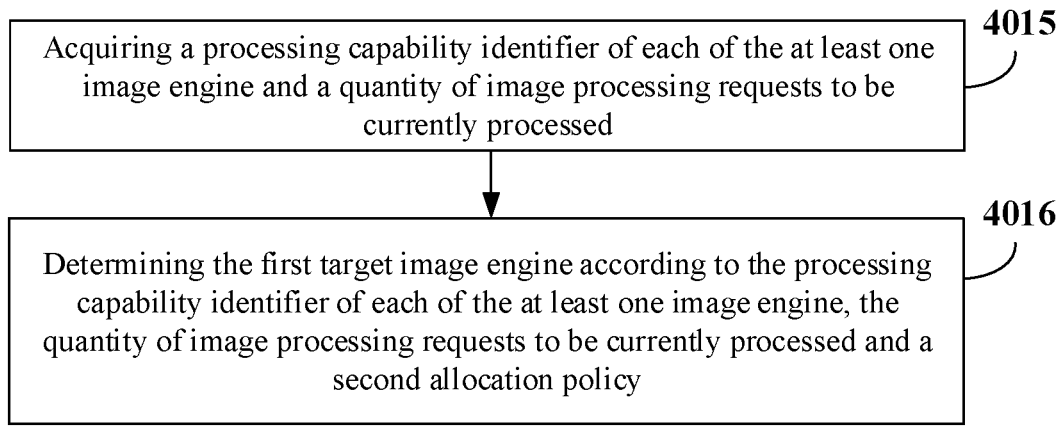
FIG. 7 is a schematic flowchart of yet another image processing method in accordance with an embodiment of the present disclosure.

An embodiment of the present disclosure further provides an image processing method. In the present embodiment, as shown in FIG. 7, step 401 may include steps 4015 and 4016.

In step 4015, the server acquires a processing capability identifier of each of the at least one image engine and a quantity of image processing requests to be currently processed.

In step 4016, the server determines the first target image engine according to the processing capability identifier of each of the at least one image engine, the quantity of image processing requests to be currently processed and a second allocation policy. The second allocation policy is relevant to the processing capability identifier of the image engine and the quantity of image processing requests to be currently processed.

In this embodiment, the server may further include a storage module, which stores the respective processing capability identifiers of all the image engines and the second allocation policy. The second allocation policy may be a default setting or a user setting and is relevant to the processing capability identifier of the image engine and the quantity of image processing requests to be currently processed. The image processing request to be currently processed of one image engine is an image processing request queued for being processed in a processing queue of the image engine.

For example, if the processing queue of the image engine with the processing capability identifier of 1 includes 5 image processing requests, the quantity of image processing requests to be currently processed of the image engine with the processing capability identifier of 1 is 5. If the processing queue of the image engine with the processing capability identifier of 2 includes 2 image processing requests, the quantity of image processing requests to be currently processed of the image engine with the processing capability identifier of 2 is 2. When the server receives another 8 image processing requests that are not included in the above processing queue, the control module allocates 5 of the 8 image processing requests that are not included in the queue to the image engine with the processing capability identifier of 1 and the remaining 3 image processing requests to the image engine with the processing capability identifier of 2, according to the processing capability identifier 1, the processing capability identifier 2, the quantity of image processing requests to be currently processed of the image engine with the processing capability identifier of 1 and the quantity of image processing requests to be currently processed of the image engine with the processing capability identifier of 2. That is, the image engine with the processing capability identifier of 1 is the first target image engine for processing the above 5 image processing requests, and the image engine with the processing capability identifier of 2 is the first target image engine for processing the remaining 3 image processing requests.

In this embodiment, the server determines the first target image engine according to the processing capability identifier of each of the image engines, the quantity of image processing requests to be currently processed of the image engines and the second allocation policy. The image processing requests can be dynamically allocated according to the processing capacities of the image engines and the quantity of image processing requests to be currently processed to avoid clogging, which in turn can improve the image processing efficiency.

Figure 8:
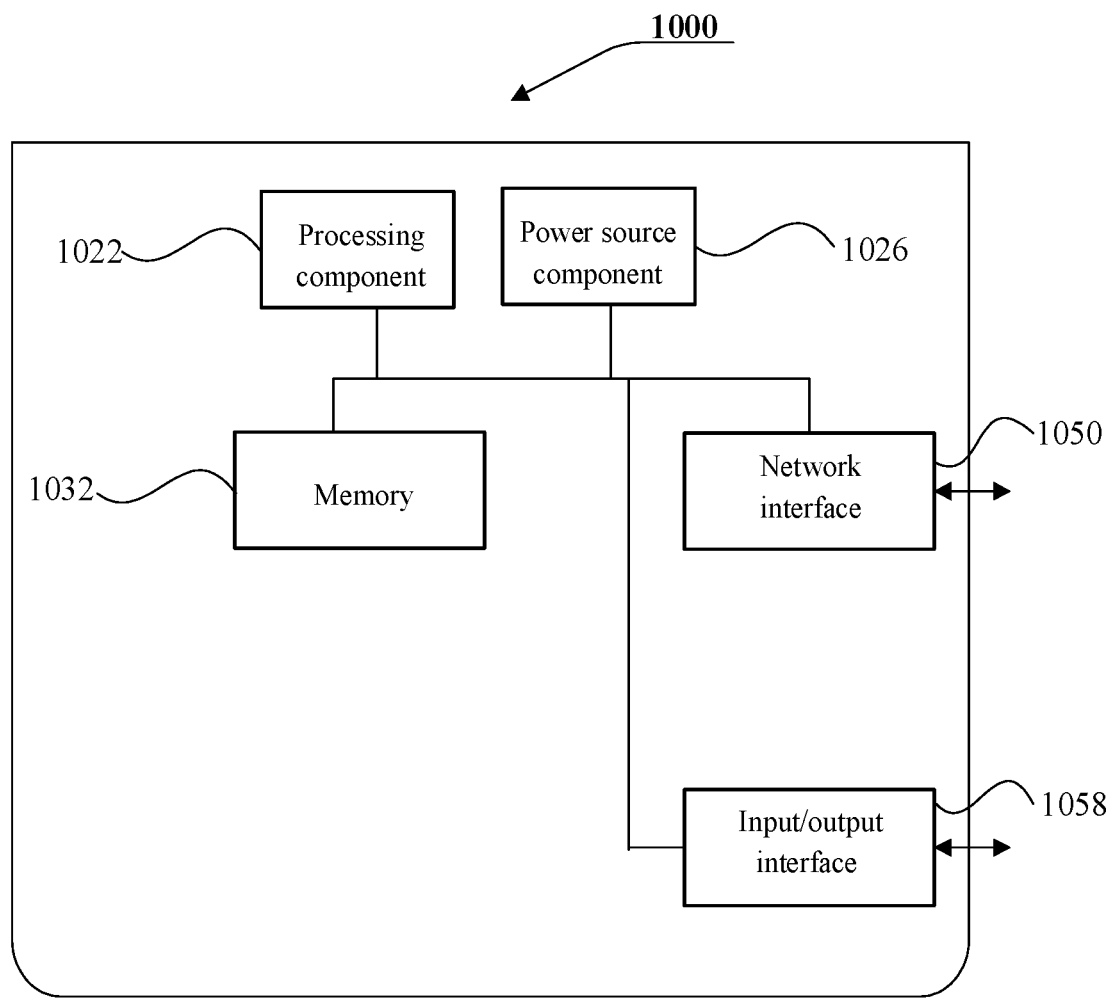
FIG. 8 is a schematic block diagram of a server in accordance with an embodiment of the present disclosure.

An embodiment of the present disclosure further provides a computer device. For example, the device 1000 may be provided as a server. Referring to FIG. 8, the device 1000 includes a processing component 1022 which further includes one or more processors, and memory resources represented by a memory 1032 for storing instructions executable by the processing component 1022, for example, an application program. The application program stored in the memory 1032 may include one or more modules, each of which corresponds to a set of instructions. Moreover, the processing component 1022 is configured to execute the instructions so as to perform the image processing method shown in FIG. 1 or FIG. 3.

The device 1000 may further include a power source component 1026 configured to perform power source management on the device 1000, a wired or wireless network interface 1050 configured to connect the device 1000 to a network, and an input/output (I/O) interface 1058. The device 1000 can operate an operating system stored in the memory 1032, such as Windows Server™, Mac OS X™, Unix™, Linux™, FreeBSD™, or the like.

In an exemplary embodiment, there is also provided a non-transitory computer-readable storage medium including instructions, for example, a memory 1032 including instructions. The instructions can be executed by the processing component 1022 of the device 1000 to complete the above-mentioned method. For example, the non-transitory computer-readable storage medium may be a read only memory (ROM), a random access memory (RAM), a CD-ROM, a magnetic tape, a floppy disk, an optical data storage device, or the like.

Figure 9:
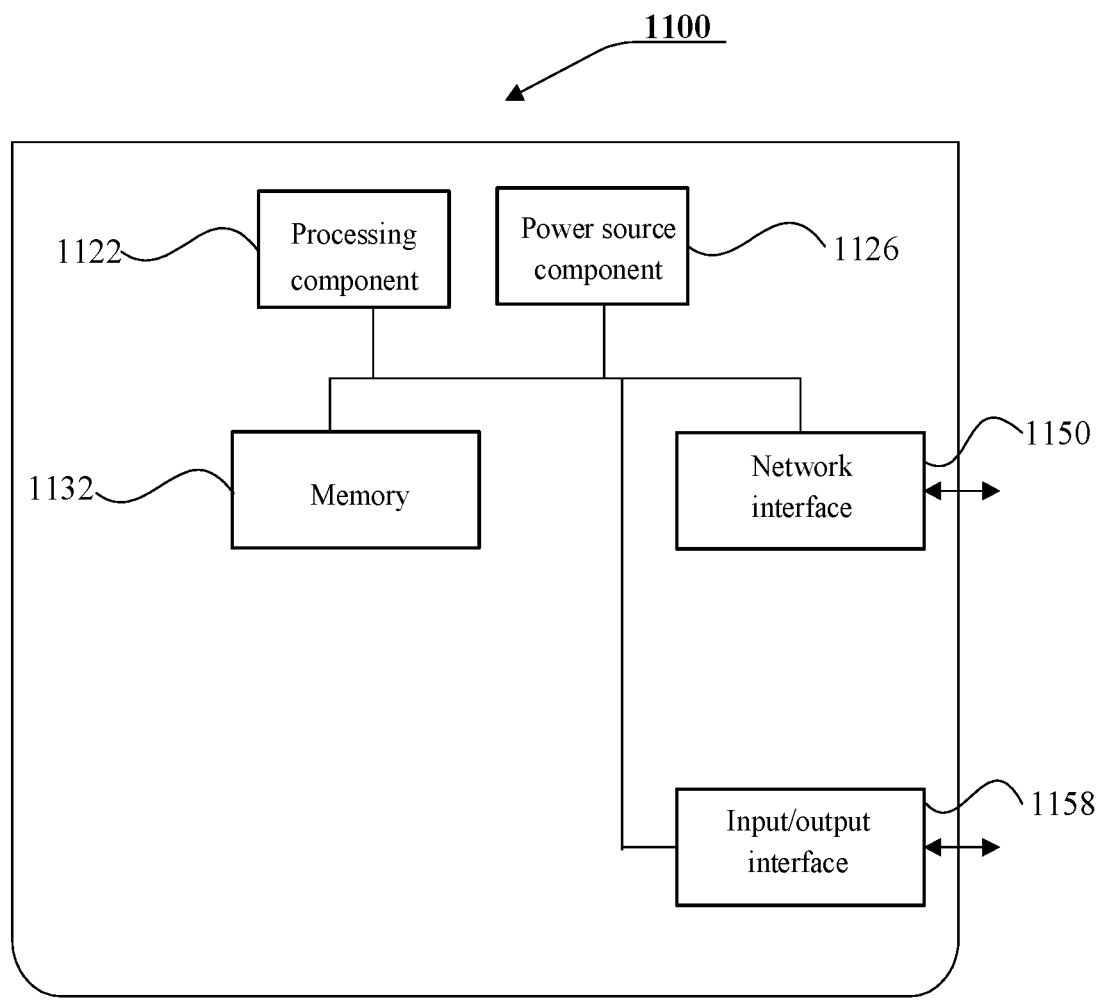
FIG. 9 is a schematic block diagram of a client in accordance with an embodiment of the present disclosure.

An embodiment of the present disclosure further provides a computer device. For example, the device 1100 may be provided as a client. Referring to FIG. 9, the device 1100 includes a processing component 1122 which further includes one or more processors, and memory resources represented by a memory 1132 for storing instructions executable by a processing component 1122, for example, an application program. The application program stored in the memory 1132 may include one or more modules, each of which corresponds to a set of instructions. Moreover, the processing component 1122 is configured to execute the instructions so as to execute the image processing method shown in FIG. 2 or FIG. 3.

The device 1000 may further include a power source component 1126 configured to perform power source management on the device 1100, a wired or wireless network interface 1150 configured to connect the device 1100 to a network, and an I/O interface 1158. The device 1100 can operate an operating system stored in the memory 1132, such as Windows Server™, Mac OS X™, Unix™, Linux™, FreeBSD™, or the like.

In an exemplary embodiment, there is also provided a non-transitory computer-readable storage medium including instructions, for example, a memory 1132 including instructions. The instructions can be executed by the processing component 1122 of the device 1100 to complete the above-mentioned method. For example, the non-transitory computer-readable storage medium may be a ROM, a RAM, a CD-ROM, a magnetic tape, a floppy disk, an optical data storage device, or the like.

An embodiment of the present disclosure further provides an image processing system, including the server shown in FIG. 8 and the client shown in FIG. 9.

In some embodiments, the image processing request includes service information. The feedback message includes the target image and the service information. The image processing system further includes the database. The client is configured to acquire the target image and the service information according to the feedback message, and to store the target image and the service information in the database.

In some embodiments, the image processing system further includes the message forwarding device, the border gateway and the display device. The client is configured to generate a service instruction according to the target image and the service information and to send the service instruction to the message forwarding device. The message forwarding device is configured to acquire the service information according to the service instruction, to determine the corresponding border gateway according to the service information and a corresponding relationship between the service information and the border gateway, and to send the target image to the corresponding border gateway. The border gateway is configured to send the target image to the display device, such that the display device displays the target image.

In the present disclosure, the terms such as "first" and "second" are merely for a descriptive purpose, and cannot be understood as indicating or implying a relative importance. The term "a plurality of" means two or more in number, unless otherwise defined.

The term "and/or" in the present disclosure merely describes the association relationship between the associated objects and indicates that there may be three relationships; for example, A and/or B may indicate three cases where only A exists, A and B exist at the same time, and only B exists. The character "/" in the present disclosure generally indicates that the relationship between the former and later associated objects is "OR".

The expression "at least one of A and B" in the present disclosure merely describes the association relationship between the associated objects and indicates that there may be three relationships; for example, at least one of A and B may indicate three cases where only A exists, A and B exist at the same time, or only B exists. Likewise, "at least one of A, B and C" may indicate seven relationships that A exists alone, B exists alone, C exists alone, A and B exist at the same time, A and C exist at the same time, C and B exist at the same time, and A, B and C exist at the same time. Similarly, "at least one of A, B, C and D" may indicate fifteen relationships that A exists alone, B exists alone, C exists alone, D exists alone, A and B exist at the same time, A and C exist at the same time, A and D exist at the same time, C and B exist at the same time, D and B exist at the same time, C and D exist at the same time, A, B and C exist at the same time, A, B and D exist at the same time, A, C and D exist at the same time, B, C and D exist at the same time and A, B, C and D exist at the same time.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. An image processing method, applicable to an image processing system comprising a server, a client, a message forwarding device, a border gateway, and a display device; and the method a client, comprising:
   generating, by the client, an image processing request according to a to-be-processed image in a first image format, wherein the image processing request comprises service information;
   sending, by the client, the image processing request to a server, such that the server acquires the to-be-processed image according to the image processing request, processes the to-be-processed image to obtain a target image in a second image format, and generates a feedback message according to the target image, wherein the feedback message comprises the target image and the service information; receiving, by the client, the feedback message from the server;
   generating, by the client, a service instruction according to the target image and the service information, and send the service instruction to the message forwarding device;
   acquiring, by the message forwarding device, the service information according to the service instruction;
   determining, by the message forwarding device, the corresponding border gateway according to the service information and a corresponding relationship between the service information and the border gateway;
   sending, by the message forwarding device, the target image to the corresponding border gateway; and
   sending, by the border gateway, the target image to the display device, such that the display device displays the target image.

2. The image processing method according to claim 1, wherein the feedback message comprises a preview image that complies with a display protocol of the client; and the method further comprises:
   acquiring the preview image according to the feedback message; and
   displaying the preview image.

3. A computer device, comprising:
   a processor; and
   a memory configured to store a computer program;
   wherein the processor is configured to execute the computer program stored in the memory to perform the method as defined in claim 1.

4. A non-transitory computer-readable storage medium storing a computer program therein, wherein the computer program is executable by a processor to perform the method as defined in claim 1.

5. An image processing system, comprising a server, a message forwarding device, a border gateway, a display device and a client; wherein
   the server comprises a processor and a memory, wherein the memory is configured to store a computer program, and the processor is configured to:
   execute an image processing request from the client, the image processing request comprising a to-be-processed image in a first image format;
   acquire the to-be-processed image according to the image processing request; process the to-be-processed image to obtain a target image in a second image format; and
   generate a feedback message according to the target image and send the feedback message to the client; and
   the client comprises a processor and a memory, wherein the memory is configured to store a computer program, and the processor is configured to:
   generate the image processing request according to the to-be-processed image in the first image format;
   send the image processing request to the server such that the server acquires the to-be-processed image according to the image processing request, processes the to-be-processed image to obtain the target image in the second image format and generates the feedback message according to the target image; and
   receive the feedback message from the server,
   wherein the image processing request comprises service information, and the feedback message comprises the target image and the service information;
   the client is configured to generate a service instruction according to the target image and the service information, and send the service instruction to the message forwarding device;
   the message forwarding device is configured to acquire the service information according to the service instruction, determine the corresponding border gateway according to the service information and a corresponding relationship between the service information and the border gateway, and send the target image to the corresponding border gateway; and the border gateway is configured to send the target image to the display device, such that the display device displays the target image.

6. The image processing system according to claim 5, wherein the image processing request comprises service information, the feedback message comprises the target image and the service information, the image processing system further comprises a database; and the client is configured to acquire the target image and the service information according to the feedback message, and store the target image and the service information in the database.

7. The image processing system according to claim 5, wherein the server comprises at least one image engine; and the server is further configured to determine a first target image engine for processing the image processing request in the at least one image engine, to invoke the first target image engine, to acquire the to-be-processed image according to the image processing request by the first target image engine, and to process the to-be-processed image to obtain the target image in the second image format.

8. The image processing system according to claim 7, wherein the server is further configured to acquire a state identifier of each of the at least one image engine, and determine the first target image engine in the idle state according to the state identifier of each of the at least one image engine, the state identifier being intended to identify whether the image engine is in an operating state or an idle state.

9. The image processing system according to claim 7, wherein the server is further configured to acquire a processing capability identifier of each of the at least one image engine, and determine the first target image engine according to the processing capability identifier of each of the at least one image engine and a first allocation policy, the first allocation policy being relevant to the processing capability identifier of the image engine.

10. The image processing system according to claim 7, wherein the server is further configured to acquire a processing capability identifier of each of the at least one image engine and a quantity of image processing requests to be currently processed, and determine the first target image engine according to the processing capability identifier of each of the at least one image engine, the quantity of image processing requests to be currently processed and a second allocation policy, the second allocation policy being relevant to the processing capability identifier of the image engine and the quantity of image processing requests to be currently processed.

11. The image processing system according to claim 5, wherein the feedback message comprises a preview image that complies with a display protocol of the client, and the client is further configured to acquire the preview image according to the feedback message and to display the preview image.

* * * * *